(12) United States Patent
Mourad et al.

(10) Patent No.: US 8,745,049 B2
(45) Date of Patent: *Jun. 3, 2014

(54) ANONYMOUS PERSONALIZED RECOMMENDATION METHOD

(71) Applicant: Google Inc., Mountain View, CA (US)

(72) Inventors: Shibl Mourad, Montreal (CA); Caitlin Kelly Phillips, Outremont (CA); Marc-Antoine Courteau, Montreal (CA); Philippe Beaudoin, Mont-Royal (CA)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/948,085

(22) Filed: Jul. 22, 2013

(65) Prior Publication Data
US 2013/0312108 A1    Nov. 21, 2013

Related U.S. Application Data

(63) Continuation of application No. 13/406,467, filed on Feb. 27, 2012, now Pat. No. 8,521,735.

(51) Int. Cl.
*G06F 17/30* (2006.01)

(52) U.S. Cl.
USPC ............ 707/732; 707/733; 707/734; 707/748

(58) Field of Classification Search
CPC ................ G06F 17/30867; G06F 17/3087
See application file for complete search history.

(56) References Cited

U.S. PATENT DOCUMENTS

| | | | |
|---|---|---|---|
| 6,493,702 B1 | 12/2002 | Adar et al. | |
| 6,728,752 B1 | 4/2004 | Chen et al. | |
| 7,092,936 B1 | 8/2006 | Alonso et al. | |
| 7,558,822 B2 | 7/2009 | Fredricksen et al. | |
| 8,238,888 B2 | 8/2012 | Ramer et al. | |
| 8,316,019 B1 * | 11/2012 | Ainslie et al. | 707/733 |
| 2005/0071328 A1 | 3/2005 | Lawrence | |
| 2005/0240580 A1 | 10/2005 | Zamir et al. | |
| 2005/0278317 A1 | 12/2005 | Gross et al. | |
| 2007/0143260 A1 | 6/2007 | Markov et al. | |
| 2008/0209351 A1 | 8/2008 | Macadaan et al. | |
| 2009/0037355 A1 | 2/2009 | Brave et al. | |
| 2009/0292696 A1 | 11/2009 | Shuster | |

(Continued)

OTHER PUBLICATIONS

Keenoy, et al., "Personalisation of Web Search," Intelligence Tecnhiques for Web Personalization, Lecutre Notes in Computer Science, (2005) vol. 3169, pp. 201-228.

(Continued)

*Primary Examiner* — Daniel Kinsaul
(74) *Attorney, Agent, or Firm* — McDermott Will & Emery LLP

(57) ABSTRACT

A computer-implemented method for an anonymous personalized recommendation is provided. The method includes receiving select server fingerprints selected from server fingerprints based on predetermined metrics. The server fingerprints correspond to a plurality of public entities and each server fingerprint includes encoded information about a corresponding public entity. The method also includes generating a user fingerprint based on user information associated with a user, the user fingerprint comprising encoded user information. The method further includes comparing the user fingerprint with the select server fingerprints to select a server fingerprint for recommendation, generating a recommendation of a public entity corresponding to the server fingerprint for recommendation, and displaying the recommendation. Systems and machine-readable media are also provided.

20 Claims, 5 Drawing Sheets

(56) References Cited

U.S. PATENT DOCUMENTS

| | | |
|---|---|---|
| 2009/0319436 A1 | 12/2009 | Andra et al. |
| 2010/0070507 A1 | 3/2010 | Mori |
| 2010/0100607 A1 | 4/2010 | Scholz et al. |
| 2010/0169293 A1 | 7/2010 | Gerber |
| 2010/0211568 A1 | 8/2010 | Chu et al. |
| 2010/0293160 A1* | 11/2010 | Aravamudan et al. ........ 707/734 |
| 2011/0072013 A1 | 3/2011 | Mosoi et al. |
| 2011/0255150 A1 | 10/2011 | Nguyen |
| 2012/0084818 A1 | 4/2012 | Ali et al. |

OTHER PUBLICATIONS

Xu, et al., "Privacy-Enhancing Personalized Web Search," Proc. 16th Int'l Conf on World Wide Web (2007), pp. 591-600.

Shen, et al., "Privacy Protection in Personalized Search," ACM SIGIR Forum (2007), vol. 41, No. 1, pp. 4-17.

* cited by examiner

ANONYMOUS PERSONALIZED RECOMMENDATION METHOD

CROSS-REFERENCE TO RELATED APPLICATIONS

The present application is a continuation of U.S. patent application Ser. No. 13/406,467 entitled "ANONYMOUS PERSONALIZED RECOMMENDATION METHOD," filed on Feb. 27, 2012, which is hereby incorporated by reference in its entirety for all purposes.

TECHNICAL FIELD

The present disclosure generally relates to providing recommendations to users, and more particularly to making anonymous and personalized recommendations of publicly available entities to users.

BACKGROUND

The Internet allows users access to a large amount of information, and the amount is constantly increasing. However, the increasing amount of information makes it difficult for the users to find information that is interesting or relevant to what they are looking for. Recommendation engines are available which, through various methods, recommend to the user information or entities that are publicly available ("public entities") such as, web sites, articles, blogs or other users which the user may find interesting or relevant. However, existing engines typically require the user to share user information with a recommendation provider.

SUMMARY

The disclosed subject matter relates to a computer-implemented method for anonymously recommending public entities. The method includes receiving, at a client of a user from a server, a number of select server fingerprints selected from server fingerprints based on predetermined metrics, the server fingerprints corresponding to a plurality of public entities, wherein the predetermined metrics comprise at least one of information related to the user and information related to a public entity, and each server fingerprint comprises encoded information about a corresponding public entity, the encoded information comprising information for identifying the corresponding public entity and information for determining whether to recommend the public entity to a user. The method also includes generating, at the client, a user fingerprint based on user information associated with the user, the user fingerprint comprising encoded user information, wherein the user information comprises information representative of the user's interests and wherein the user fingerprint is not transmitted outside the client. The method further includes comparing, at the client, the user fingerprint with the select server fingerprints to select at least one server fingerprint for recommendation, generating, at the client, at least one recommendation of a public entity corresponding to the at least one server fingerprint for recommendation, and displaying the at least one recommendation.

The disclosed subject matter further relates to a system for anonymously recommending public entities. The system includes a memory storing executable instructions. The system also includes a processor coupled to the memory configured to execute the stored executable instructions to receive at a client of a user, a number of select server fingerprints, wherein the select server fingerprints are selected from server fingerprints based on predetermined metrics, and wherein the server fingerprints correspond to a plurality of public entities, wherein the predetermined metrics comprise at least one of information related to the user and information related to a public entity, and each server fingerprint comprises encoded information about a corresponding public entity, the encoded information comprising information for identifying the corresponding public entity and information for determining whether to recommend the public entity to a user. The processor is also configured to generate, at the client, a user fingerprint based on user information associated with the user, the user fingerprint comprising encoded user information, wherein the user information comprises information representative of the user's interests and wherein the user fingerprint is not transmitted outside the client. The processor is further configured to compare, at the client, the user fingerprint with the select server fingerprints to select at least one server fingerprint for recommendation, and generate, at the client, at least one recommendation of a public entity corresponding to the at least one server fingerprint for recommendation. The processor is yet further configured to receive, at the client, a search result based on an information search request made by the user, modify, at the client, the search result based on the generated recommendation, and display the modified search result.

The disclosed subject matter also relates to a machine-readable storage medium comprising machine-readable instructions for causing a processor to execute a method for anonymously recommending public entities. The method receiving, at a client of a user from a server, a number of select server fingerprints selected from server fingerprints based on predetermined metrics, the server fingerprints corresponding to a plurality of public entities, wherein the select server fingerprints are received in response to a user action and the predetermined metrics comprise at least one of information related to the user and information related to a public entity, and each server fingerprint comprises encoded information about a corresponding public entity, the encoded information comprising information for identifying the corresponding public entity and information for determining whether to recommend the public entity to a user. The method also includes generating, at the client, a user fingerprint based on user information associated with the user, the user fingerprint comprising encoded user information, wherein the user information comprises information representative of the user's interests and wherein the user fingerprint is not transmitted outside the client. The method further includes comparing, at the client, the user fingerprint with the select server fingerprints to select at least one server fingerprint for recommendation, generating, at the client, at least one recommendation of a public entity corresponding to the at least one server fingerprint for recommendation, and displaying the at least one recommendation.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

Figure 1:
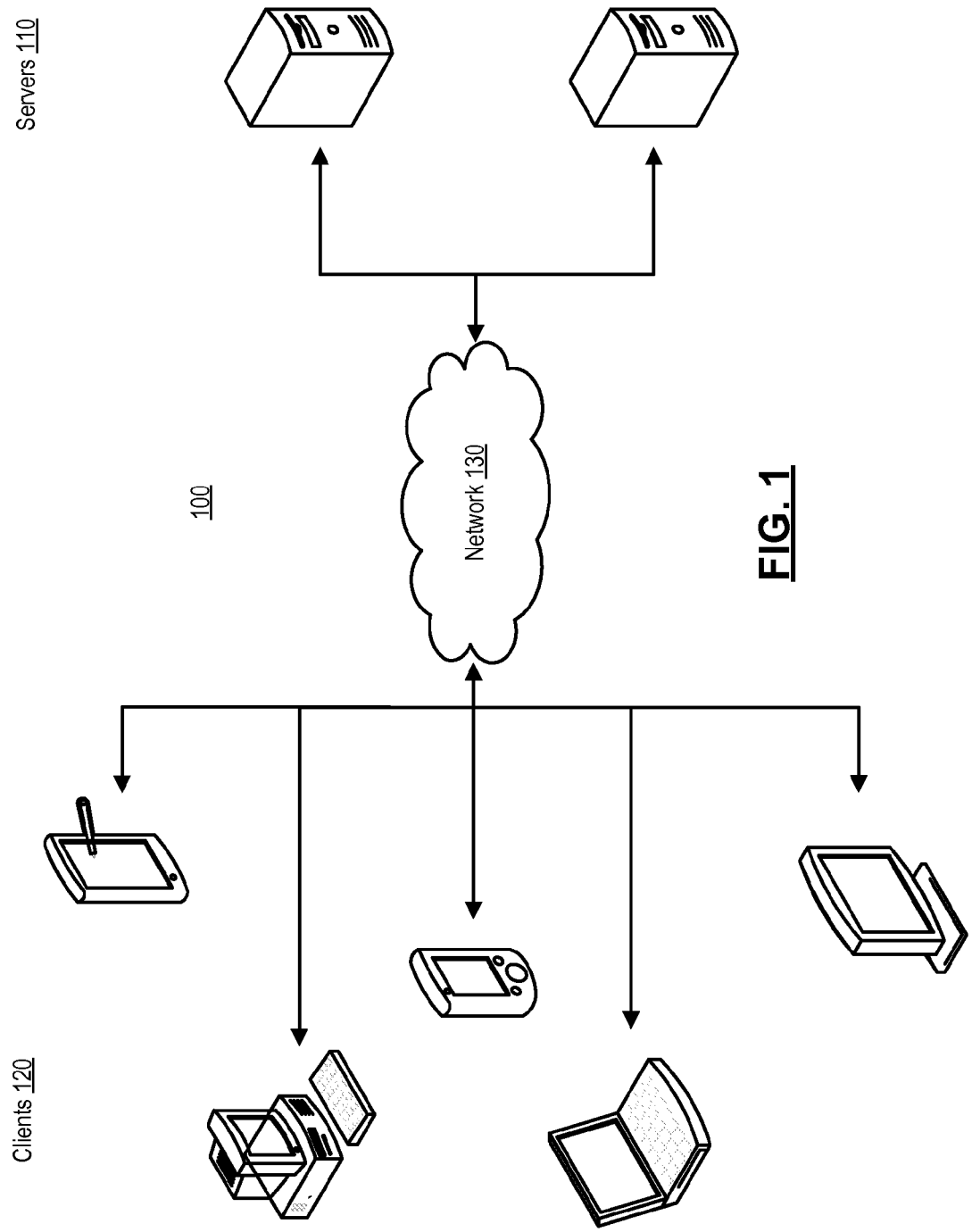
FIG. 1 illustrates an example architecture for anonymously making personalized recommendations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Existing recommendation engines require users to share private information in recommending public entities to the user. However, the sharing of user information on the Internet raises concerns about user privacy. As more and more services are moving from the desktop to cloud-based applications and services, the users are becoming increasingly concerned about privacy issues.

According to various aspects of the subject technology, an anonymous personalized recommendation method and system is provided. A client receives information from a server to provide anonymous personalized recommendations of public entities to a user. The public entities may be any type of entity or information that the user may be interested in, such as, for example, web pages, posts on the web by other users, articles, video clips, music and other users. The anonymous personalized recommendation may include a recommendation for a single public entity, or a set of recommendations for multiple public entities.

Anonymity is achieved by communicating limited or no private information about the user from the client to the server. Instead, most or all information necessary for recommending public entities to the user is transmitted from the server to the client. Since limited or no private information is sent to the server to refine the candidates that are sent to the client, the information sent to the client varies widely in scope, and potentially includes a large amount of data. In order to reduce the amount of data transmitted to the client, the server communicates information on the public entities in the form of fingerprints. A fingerprint is a piece of data which is relatively small in size, but includes sufficient information to identify the corresponding public entities and information which may be used for making recommendations to the user.

The client also generates a fingerprint about the user ("user fingerprint"). The user fingerprint may be similar to the server fingerprint in form, and includes information about the user which may be compared with the fingerprints about the public entities generated at the server ("server fingerprints") to generate a recommendation.

In generating the server fingerprints, the server first gathers data on public entities. Various metrics may be used to determine data for which public entities are gathered. For example, the server may gather data on web pages that are currently popular on the Internet. The gathered data on public entities may include, for example, textual or graphical information which may be included in the public entities, the URL for accessing the public entities, the types of information stored in the public entities, dates of creation, data sizes of the public entities, and popularity. Other types of data on the public entities may also be gathered.

The server fingerprints are generated from the gathered data for each public entity such that the size of the fingerprints are relatively small, but at the same time include sufficient information for making recommendations to the user and for identifying their corresponding public entities. After generating the server fingerprints, the server sends the generated server fingerprints to the client. A predetermined number (e.g., 1000) of server fingerprints may be sent to the client at a time.

In generating the user fingerprints, the client first gathers user information such as, for example, search terms that the user enters in a search engine, history of web pages that the user visited, or links contained in the user's bookmarks. Other types of user information may also be gathered in generating the user fingerprint. From the gathered user information, the client derives a user fingerprint. The user fingerprint may be encoded in various forms such that information stored in the user fingerprint may be compared against the server fingerprints received from the server to make a recommendation of a public entity that the user may be interested in. The encoding used for the user fingerprint may be different from that used in the server fingerprint in that, since the user fingerprint is not communicated to the server, the encoding need not be focused on compressing the size of the user fingerprint. However, the user fingerprint may use the same encoding method as used in the server fingerprints, or use no encoding at all (e.g., store the gathered user information without modification in the user fingerprint). The user fingerprint may then be compared against the received server fingerprints to generate a recommendation of one or more public entities to recommend to the user.

During the entire process, no private user information is communicated to the server. However, in one aspect of the invention, in return for a more refined set of recommendations the client may send limited private client information to the server. For example, the user may request fingerprints corresponding to public entities related to a specific channel, geographic location, and/or language.

The recommendation may be communicated to the user in various ways. For example, when the user accesses an application (e.g., a web browser), the application may display to the user a set of recommendations. As another example, when a user accesses an online destination (e.g., a web site), the first page may show a set of recommendations.

The phrase "fingerprint" as used herein encompasses its plain and ordinary meaning including, but not limited to, a distinctive or identifying mark or characteristic. A fingerprint of a public entity includes sufficient information for identifying the public entity (e.g., a URL) and also includes sufficient information to determine whether to recommend the public entity to a user. A fingerprint of a user includes sufficient information to be compared against a fingerprint of a public entity and be used as a basis for determining whether to recommend the public entity to a user.

The phrase "channel" as used herein encompasses its plain and ordinary meaning including, but not limited to, a grouping of public entities based on their related subject matters. A channel may include one or more public entities that are related to similar subject matters or topics. For example, a "technology" channel may include public entities that discuss or are related to technological issues.

Turning to the drawings, FIG. 1 illustrates an example architecture 100 for anonymously making personalized recommendations. The architecture 100 includes servers 110 and clients 120 connected over a network 130. Each of the clients 120 may interact with users, and communicate with the servers 110 to make anonymous personalized recommendations to users. The servers 110 may be any device having an appropriate processor, memory, and communications capability for communicating with the clients 120 for making anonymous personalized recommendations to the users. The clients 120 may be, for example, desktop computers, laptop computers, mobile devices (e.g., a smart phone, tablet computer, or PDA), set top boxes (e.g., for a television), televisions, video game consoles, home appliances (e.g. a refrigerator, microwave oven, washer, or dryer) or any other devices having appropriate processor, memory, and communications capabilities for interacting with the user and communicating with the servers 110.

The network 130 may include, for example, any one or more of a personal area network (PAN), a local area network (LAN), a campus area network (CAN), a metropolitan area network (MAN), a wide area network (WAN), a broadband network (BBN), the Internet, and the like. Further, the network 130 can include, but is not limited to, any one or more of the following network topologies, including a bus network, a star network, a ring network, a mesh network, a star-bus network, tree or hierarchical network, and the like. The architecture 100 may comprise only servers 110, or may comprise only clients 120, in communication with the network 130.

Figure 2:
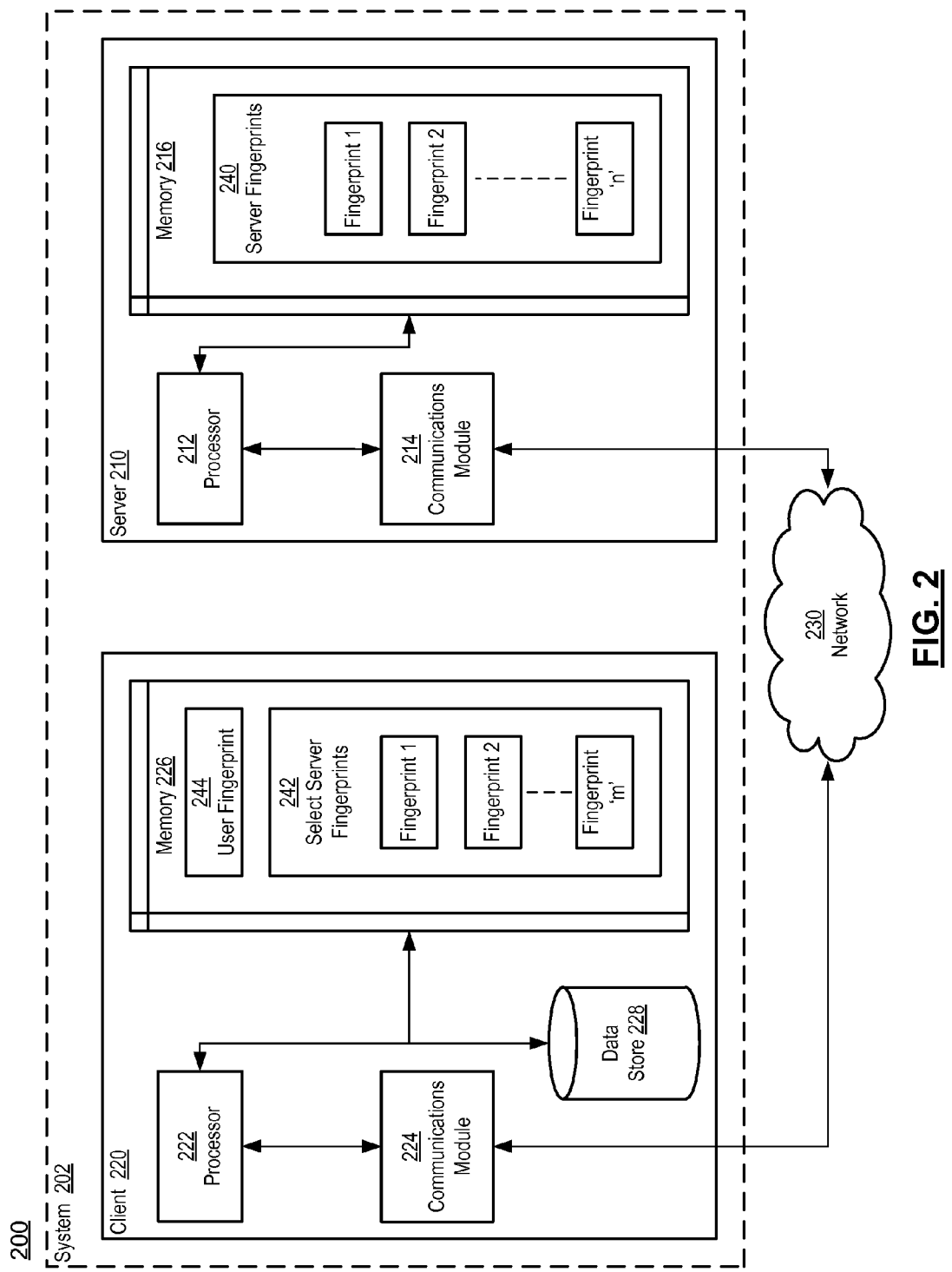
FIG. 2 is a block diagram illustrating an example anonymous personalized recommendation system.

FIG. 2 is a block diagram 200 illustrating an example system 202 for anonymously making personalized recommendations. The system 202 may be implemented, for example, across a server (e.g. a server of servers 110) and a client (e.g., a client of clients 120), across multiple servers and clients, in one server, across multiple servers, in one client, or across multiple clients. The block diagram 200 shows the system 202 implemented across a server 210 and a client 220. The server 210 includes a processor 212, a communications module 214, and a memory 216. The server 210 is connected to a network 230 (e.g., network 130) via the communications module 214. The communications module 214 is configured to interface with the network 230 to send and receive information, such as data, requests, responses, and commands to other devices (e.g., client 220) or systems on the network. The communications module 214 may be, for example, modems, Ethernet cards or mobile broadband adaptors.

The client 220 includes a processor 222, a communications module 224, and a memory 226. The client 220 is connected to the network 230 via the communications module 224. The communications module 224 is configured to interface with the network 230 to send and receive information, such as data, requests, responses, and commands to other devices (e.g., server 210) or systems on the network. The communications module 224 may be, for example, modems, Ethernet cards or mobile broadband adaptors.

The memory 216 of the server 210 stores server fingerprints 240. The server fingerprints 240 are derived from gathered data on the public entities, as discussed above. As it will be discussed in more detail below, select fingerprints 242 of the server fingerprints 240 may be communicated to the client 220, and stored in the memory 226. The memory 226 of the client 220 may also store user fingerprints 244 including information related to the user. The client 220 may also include a data store 228. The data store 228 may be integrated with the memory 226, or may be independent from the memory 226 and be in communication with the processor 222 and the memory 226. The data store 228 may also be implemented to be independent from the client 220 and in communication with the client. The select server fingerprints 242 and the user fingerprint 244 may also be stored in the data store.

The system 202 may store instructions which may be executed to make an anonymous personalized recommendation. The instructions may be stored in the memory 216 of the server 210, in the memory 226 of the client 220, or spread across memories 216 and 226. The processor 212, the processor 222, or both processors 212 and 222 may be configured to execute the instructions for making an anonymous personalized recommendation. The descriptions below will refer to either the processor 212 or 222, and to either the memory 216 or 226. However, the instructions described as being stored in one memory and being executed by one processor may also be stored in the other memory and be executed by the other processor. The instructions may also be stored across both memories and executed by both processors.

The processor 212 is configured to execute instructions, such as instructions physically coded into the processor, instructions received from software in memory 216, or a combination of both. For example, the processor 212 is configured to execute instructions to generate server fingerprints 240 corresponding to a plurality of public entities. Each server fingerprint 240 includes encoded information about a corresponding public entity. The processor 212 is also configured to choose select server fingerprints 242 from the server fingerprints 240 to communicate to the client 220 based on predetermined metrics. The metrics may be, for example, popularity of the public entities on the Internet. The processor 212 is further configured to communicate the select server fingerprints 242 to the client 220.

The processor 222 is configured to execute instructions, such as instructions physically coded into the processor, instructions received from software in memory 226, or a combination of both. For example, the processor 222 is configured to execute instructions to generate a user fingerprint 244 based on user information associated with the user. The user fingerprint 244 includes encoded user information. The processor 222 is also configured to compare the user fingerprint 244 with the select server fingerprints 242 received from the server 210, and choose a select server fingerprint 242 to recommend to the user. The processor 222 is further configured to generate a recommendation of a public entity corresponding to the chosen select server fingerprint 242.

The generated recommendation may be communicated to the user in various ways. For example, when the user opens an application, a link to the recommended public entity may be displayed to the user such that the user may click on the link and access the public entity. The application may be, for example, a web browser or an email client. As another example, when the user accesses an online destination, the first page may display the recommended public entities. The online destination may be, for example, a social networking site, a blog, or other pages or websites accessible on the Internet.

Figure 3:
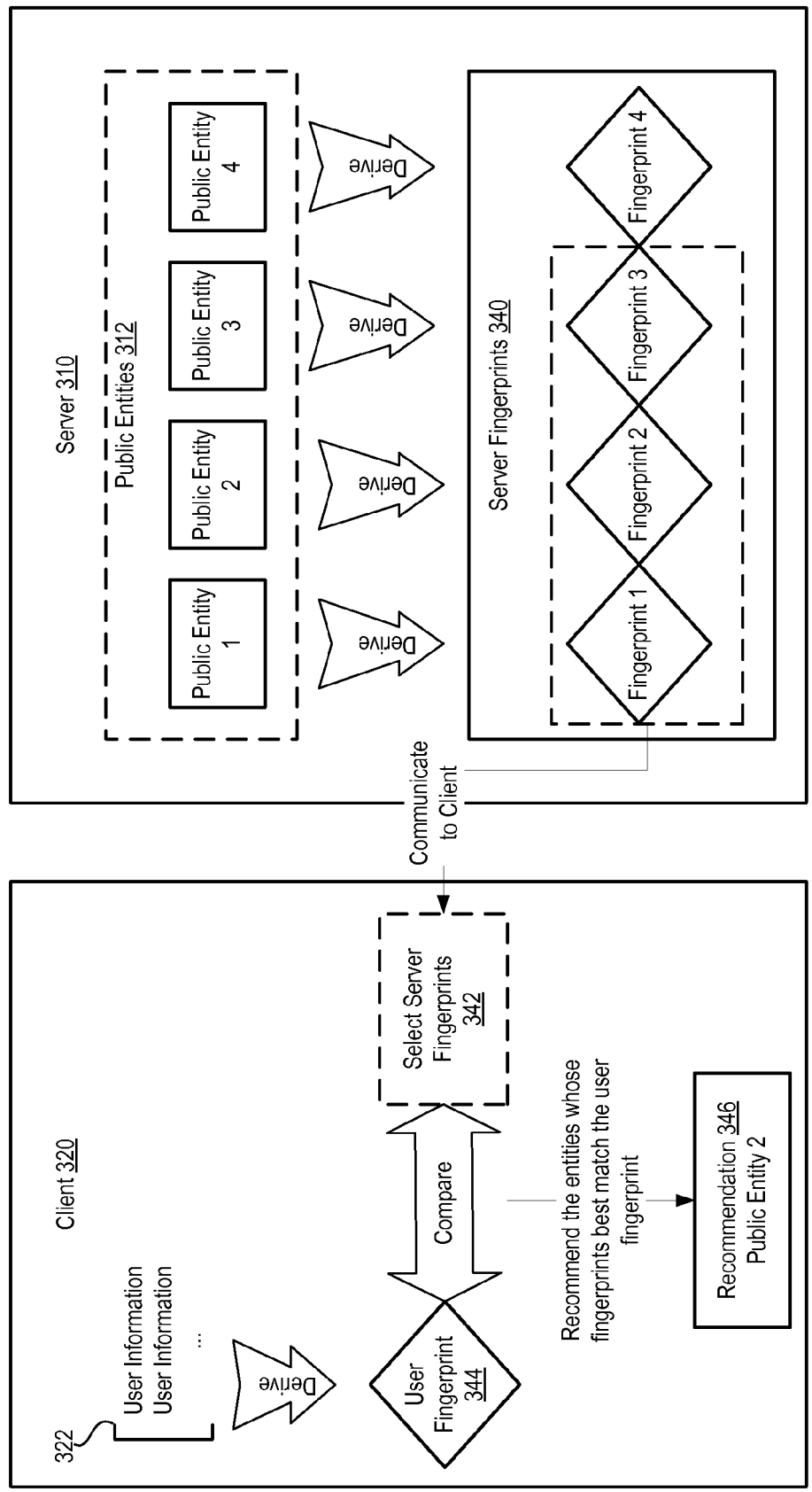
FIG. 3 is a schematic diagram illustrating example operations of an anonymous personalized recommendation system.

FIG. 3 is a schematic diagram 300 illustrating example operations of an anonymous personalized recommendation system. The operations may be performed by a system such as, for example, the system 202. A server 310 (e.g., a server of servers 110) gathers information on public entities 312 on the Internet. The public entities 312 may be any type of entity or information that the user may be interested in, such as, for example, web pages, posts on the web by other users, articles, video clips, music and other users. For pieces of information gathered for each public entity, a server fingerprint 340 (e.g., server fingerprint 240) is derived. From of the server fingerprints 340, select server fingerprints 342 are chosen based on metrics, such as, for example, popularity of the corresponding public entities among the general users on the Internet. Popularity may be determined based on any information that can be gathered by the server from the public entities and their publicly known relationships. For example, the popularity may be determined based on various features available on social networking sites for allowing users to indicate their level of interest in the public entities. As another example, popularity may also be determined based on the number of times a link is returned as a search result. After the select server fingerprints 342 are chosen, the select server fingerprints are communicated to a client 320 (e.g., a client of clients 120). A predetermined number (e.g., 1000) of select server fingerprints 342 may be sent to the client 320 at a time.

The server fingerprints 340 include information which may be used to identify the public entities 312 from which the fingerprints are derived, and also include encoded information which may be used for determining whether to recommend the public entity 312 to the user. Information in the server fingerprints 340 may be encoded such that the size of the server fingerprints are relatively small while retaining the necessary information for identifying the public entities 312 and for making recommendations. Various encoding methods may be used to compress the size of the server fingerprints 340 such that bandwidth for the server-to-client communication may be reduced.

For example, the server fingerprint 340 may include a vector of values corresponding to a predetermined number of keywords. The predetermined number may be, for example, twenty keywords. The keywords are predetermined terms which represent a wide spectrum of information on the web. For each keyword, a value within a predetermined range (e.g., one to five) may be assigned to represent the relevancy of a given public entity 312 to each keyword. The vector is the collection of these values assigned to the predetermined keywords. For example, a vector may include twenty numbers in a sequence such as "1, 5, 5, . . . 3, 4". Each value in the vector may correspond to a predefined keyword, such as, for example, "computing", "literature", "philosophy", . . . "children's interest", and "law", respectively. Each server fingerprint 340 also includes an identifier for identifying the corresponding public entity 312. The identifier may be, for example, a URL of where the public entity 312 may be located. Other encoding schemes may also be used which generates server fingerprints 340 which are relatively small in size and include sufficient information for making recommendations to the user.

As discussed above, a set of predetermined number of select server fingerprints 342 may be sent to the client 320 at a time. In the example above where the server fingerprints 340 are encoded using keywords, the keywords and the order of the keywords corresponding to the values of the vector are constant within each set. For example, if a thousand select server fingerprints 342 are sent to the client 320 in one set, for all server fingerprints in that set, the first value in the vector will always correspond to "computing", the second to "literature", the last to "law", etc. Subsequent sets of select server fingerprints 342 may use different keywords and/or order of the keywords, or may use the same keywords and/or order of the keywords. The number of keywords may also stay the same, or be different for each set of server fingerprints sent to the client. Also, the encoding of the server fingerprints 340 is not limited to using keywords, and other methods, algorithms or schemes for reducing the size of the fingerprints and retaining the necessary information (e.g., information for identifying the corresponding public entity 312 and for generating recommendations to the user) may also be used.

The client 320 receives the select server fingerprints 342 and compares the select server fingerprints with a user fingerprint 344 (e.g., user fingerprint 244). Specifically, the information in the user fingerprint 344 and the select server fingerprints 342 are compared to select one or more server fingerprints corresponding to public entities which most likely interest the user, and a recommendation is generated which identifies these public entities.

The user fingerprint 344 includes information representing the user's interests, which may be used in recommending public entities 312 to the user. In generating the user fingerprint 344, first, the client 320 gathers various user information 322. The user information 322 may be, for example, search history, browsing history, or actual pages accessed by the user. The gathered user information 322 may then be encoded into the user fingerprint 344. Various encoding methods may be used in generating the user information, as long as the generated user fingerprint 344 is compatible with being compared against the select server fingerprints 342 to generate a recommendation of public entities 312 for the user. Also, since the user fingerprint 344 is not transmitted outside the client 320, the encoding need not focus on reducing the size of the user fingerprint. Therefore, as compared with the server fingerprints 340, the user fingerprint 344 may include more elaborate data. For example, as compared with the server fingerprints 340, the user fingerprint 344 may include relevancy values corresponding to more keywords, and the range of each relevancy value may be much broader.

The following describes an example encoding method for generating the user fingerprint 344. First, individual vectors are generated for each piece of user information 322. The individual vectors may be similar to the vectors described above for the example server fingerprints 340. The individual vectors may include relevancy values corresponding to less than, the same, or more keywords as compared to the example server fingerprints. Based on such individual vectors for each piece of user information 322, a single vector is derived, which may be included in the user fingerprint 344. The single vector may be derived such that it summarizes all the individual vectors. Various methods may be used to derive the single vector from the individual vectors. For example, the single vector may be a sum of all the individual vectors. The single vector may also be the average of all the individual vectors. Other methods for deriving the single vector may also be used. The range of the relevancy values of the single vector may be much broader than the range of the example server fingerprint discussed above, since there is less restriction on the size of the user fingerprint 344 (because the user fingerprint 344 will not be communicated outside the client 320).

In an aspect of the invention, the select server fingerprints 342 that are sent to the client 320 may be refined based on limited private information communicated to the server 310. For example, the client 320 may request fingerprints 340 that are associated with public entities related to a specific channel, geographic location, and/or language. Public entities 312 may be categorized into a predetermined number of channels representing various interest areas, such as politics, news, travel, business, and world. The client 320 may request that fingerprints 340 of public entities 312 related to a specific channel be sent. The client 320 may also restrict the fingerprints 340 for public entities 312 for a specific geographic location, such as Chicago, or Mountain View. Restriction may also be made to a specific language, such as English, or Spanish. Therefore, a more efficient and refined recommendation may be made in return for sending limited private user information to the server 310.

Other non-private information that may be transmitted to the server 310 as part of a request for fingerprints may also be used to refine the select server fingerprints 342 that are sent to the client 320. For example, the request for fingerprints may be transmitted to the server 310 by conforming to a network protocol (e.g., TCP/IP, HTTP). In order to conform to the protocol, certain information may be embedded into the request, and such information may be used to refine the select server fingerprints 342 that are sent to the client 320. For example, according to the network protocol, a header may be inserted into the request for fingerprints, and such header may include a date of transmission. The date of transmission may be used in refining the select server fingerprints 342 to send to the client 320. The origin IP address of the request for fingerprints may also be used.

The user fingerprint 344 may be updated based on user actions and feedback to the recommended public entities 312. For example, a user interface, such as a button, may be provided to the user to indicate whether the user found the recommended public entity interesting. The user may click on the button to indicate that the recommendation was interesting, or not interesting. Such user input may be used in updating the user fingerprint 344. Also, the select server fingerprints 342 sent to the client 320 may be stored in a data store (e.g., data store 228) and may be reused if a new recommendation is needed. For example, after a user fingerprint 344 has been updated based on user actions, rather than receiving a new set of select server fingerprints 342 to generate an updated recommendation, the updated user fingerprint may be compared against the select server fingerprints stored in the data store to generate the updated recommendation. The generated recommendation may also be stored at the client 320 such that the recommendation may be reused without generating a new recommendation each time a recommendation is needed.

The client 320 may also request more fingerprints (e.g., new set of select server fingerprints 342) from the server 310 at any time. For example, when the select server fingerprints 342 that had been previously sent to the client 320 did not match sufficiently with the user fingerprint 344 to produce a recommendation or a set of recommendations, the client 320 may request the server 310 for more select server fingerprints.

The generated recommendations discussed above with reference to FIG. 3 may be communicated to the user without receiving an explicit request for a recommendation from the user (e.g., recommend a new website to visit when a user opens a web browser or recommend interesting items when the user accesses a web site). However, the select server fingerprints 342 and/or the generated recommendations may also be used to enhance the user's tasks performed at the client 320. For example, the generated recommendations may be used to enhance the results returned in response to the user's search query. Specifically, if the user searches online for a restaurant, and if the generated recommendations stored at the client identifies a restaurant, the restaurant identified by the recommendation may be displayed first, in addition to the results returned by the search query. The recommendations may also be used to personalize the returned search query results in other ways. Also, any information willingly transmitted by the user, and for which authorization has been received from the user for use in generating recommendations, can be used to provide a more refined set of select server fingerprints 342.

Figure 4:
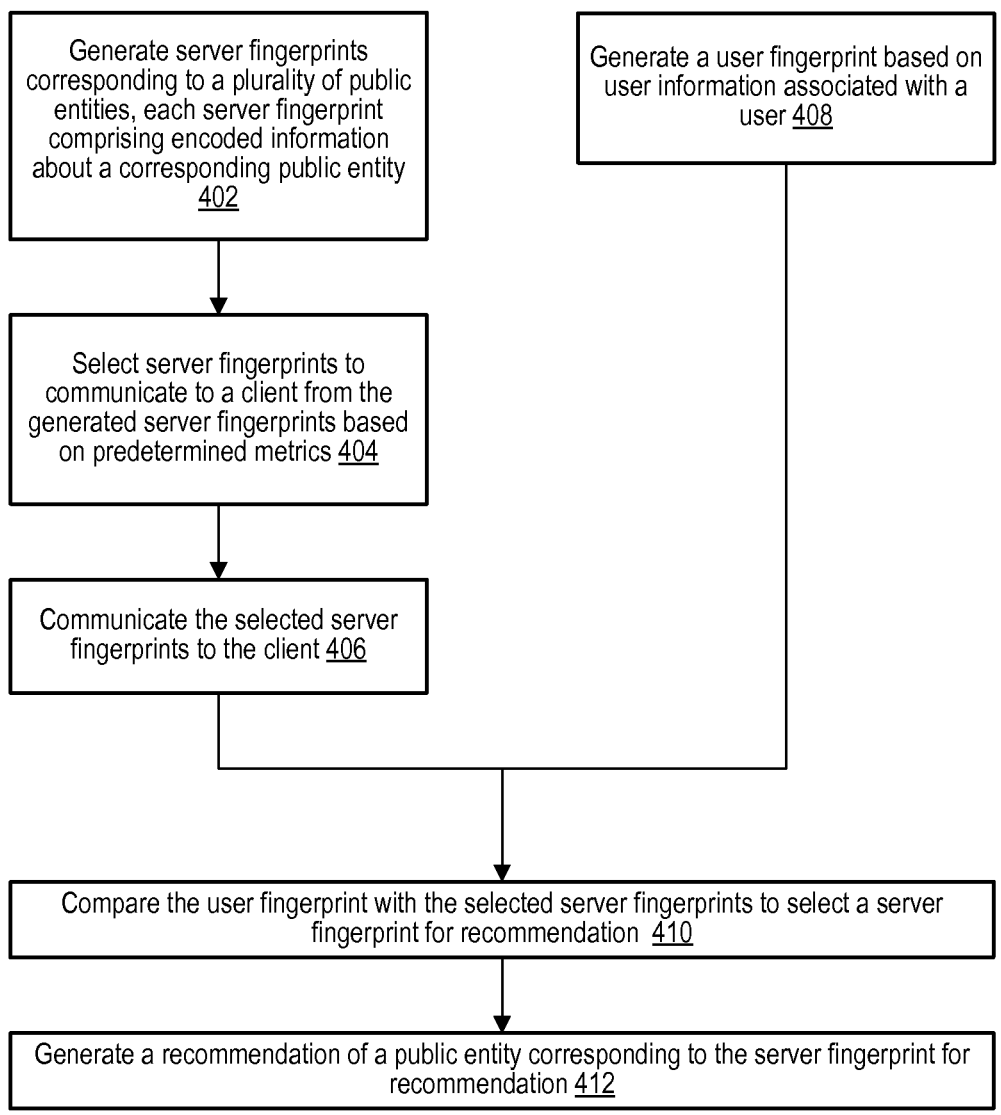
FIG. 4 illustrates an example flow diagram of example processes for an anonymous personalized recommendation system.

FIG. 4 illustrates an example flow diagram 400 of example processes for an anonymous personalized recommendation. The operations of FIG. 4 may be performed, for example, by the system 202.

The operation begins in step 402 where server fingerprints corresponding to a plurality of public entities (e.g., public entities 312) are generated. Each server fingerprint includes encoded information about a corresponding public entity. The encoded information includes identifiers for identifying the public entity and information which may be used in determining whether to recommend the public entity to a user. In step 404, from the server fingerprints generated in step 402, select server fingerprints to communicate to a client (e.g., client 120) are selected based on predetermined metrics. In step 406, the select server fingerprints are communicated to the client. The steps 402-406 may be performed at regular intervals.

In step 408, a user fingerprint is generated based on user information associated with a user (e.g., user information 322). The user fingerprint includes encoded user information. The encoded user information may include information which may be used in recommending a public entity to the user. The step 408 may be performed continuously over time. In step 410, the user fingerprint generated in step 408 is compared with the select server fingerprints communicated to the client in step 406. Based on the comparison, a server fingerprint for recommendation is selected from the select server fingerprints communicated in step 406. In step 412, a recommendation is generated which recommends to a user a public entity corresponding to the server fingerprint for recommendation which is selected in step 410. The recommendation is not limited to a single recommendation of a public entity. For example, in step 412, a set of recommendations of multiple public entities may also be generated.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include, but not limited to, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs.

Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
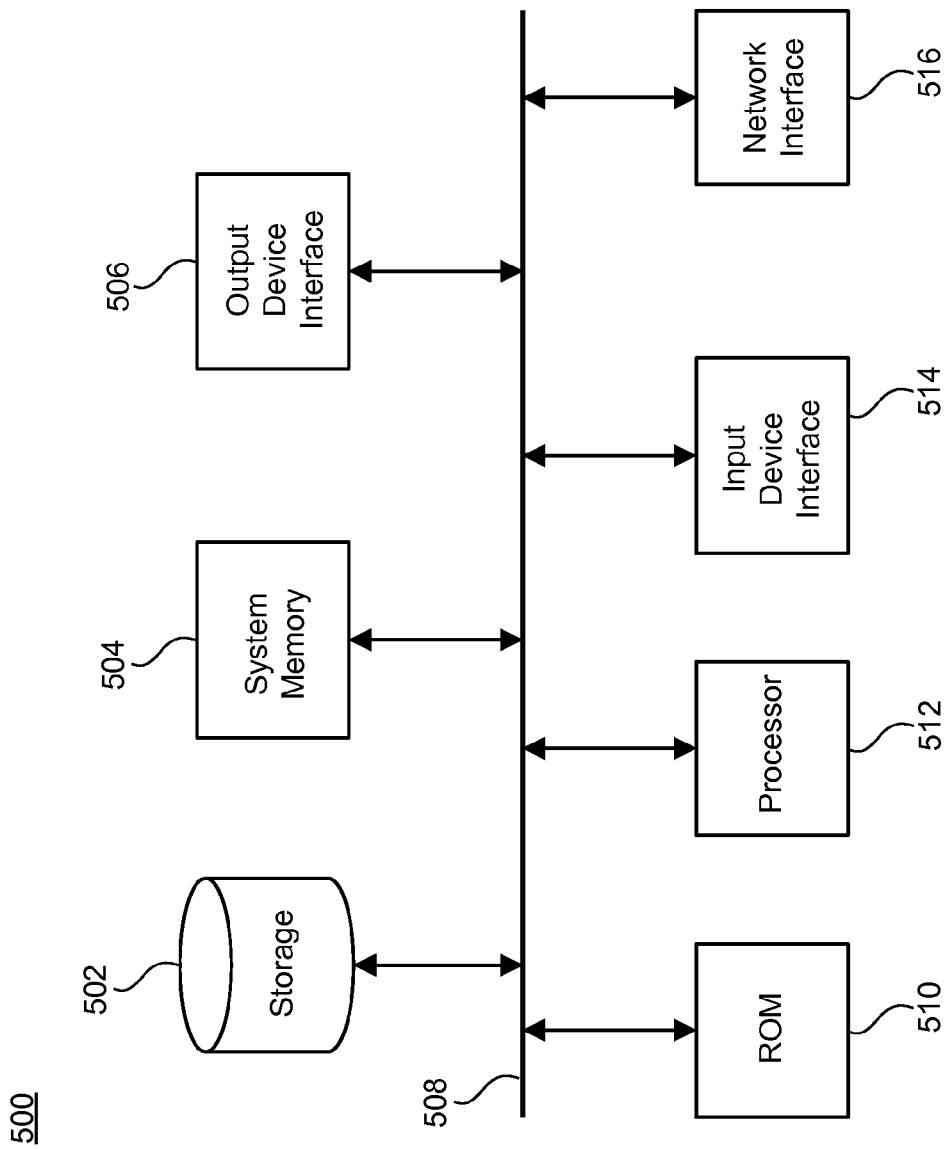
FIG. 5 conceptually illustrates an electronic system with which some implementations of the subject technology are implemented.

FIG. 5 conceptually illustrates an electronic system with which some implementations of the subject technology are implemented. Electronic system 500 can be a computer, phone, PDA, or any other sort of electronic device. Such an electronic system includes various types of computer-readable media and interfaces for various other types of computer-readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enable, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user.

Embodiments of the subject matter described in this specification can be implemented in a computing system that includes a backend component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such backend, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for anonymously recommending public entities, the method comprising:
    receiving, at a client of a user from a server, a number of select server fingerprints selected from server fingerprints based on predetermined metrics, the server fingerprints corresponding to a plurality of public entities, wherein
        the predetermined metrics comprise at least one of user-defined criteria communicated to the server from the client and popularity of the plurality of public entities,
        each server fingerprint comprises encoded information about a corresponding public entity, the encoded information comprising information for identifying the corresponding public entity and information for determining whether to recommend the public entity to a user;
    generating, at the client, a user fingerprint based on user information associated with the user, the user fingerprint comprising encoded user information, wherein the user information comprises information representative of the user's interests and wherein the user fingerprint is not transmitted outside the client;
    comparing, at the client, the user fingerprint with the select server fingerprints to select at least one server fingerprint for recommendation;
    generating, at the client, at least one recommendation of a public entity corresponding to the at least one server fingerprint for recommendation; and displaying the at least one recommendation.

2. The method of claim 1, further comprising receiving a search result based on an information search request made by the user and modifying the search result based on the generated recommendation.

3. The method of claim 1, further comprising storing the received select server fingerprints in a data store.

4. The method of claim 3, further comprising:
updating the user fingerprint based on user feedback;
comparing the updated user fingerprint with the stored select server fingerprints to select an updated server fingerprint for recommendation; and
generating an updated recommendation of a public entity corresponding to the updated server fingerprint for recommendation.

5. The method of claim 1, wherein the plurality of public entities comprise at least one of a web site, an article, a blog, and a user on a social networking site.

6. The method of claim 1, wherein the encoded information about the corresponding public entity comprises relevancy values corresponding to a plurality of keywords, each of the relevancy values representing relevancy of the corresponding public entity to each keyword.

7. The method of claim 1, wherein the user information comprises at least one of a search history of the user, web page access history of the user, and web page bookmarks of the user.

8. The method of claim 1, wherein the encoded user information comprises relevancy values corresponding to a plurality of keywords, each of the relevancy values representing relevancy of the user information to each keyword.

9. The method of claim 1, wherein the select server fingerprints are selected based on at least one of popularity of the corresponding public entity, a category of public entities requested by the user, geographic location associated with the user, and language requested by the user.

10. The method of claim 1, wherein the encoded information is encoded to compress a size of the each server finger print.

11. The method of claim 1, further comprising communicating a request for the select server fingerprints to a server by conforming to a network protocol;
wherein the select server fingerprints are received in response to the request for the select server fingerprints.

12. The method of claim 11, wherein in the step of selecting the server fingerprints to communicate to the client, the server fingerprints are selected based on information generated as part of the network protocol.

13. A system for anonymously recommending public entities, the system comprising:
a memory storing executable instructions; and
a processor coupled to the memory configured to execute the stored executable instructions to:
receive at a client of a user, a number of select server fingerprints, wherein the select server fingerprints are selected from server fingerprints based on predetermined metrics, and wherein the server fingerprints correspond to a plurality of public entities, wherein,
the predetermined metrics comprise at least one of user-defined criteria communicated to the server from the client and popularity of the plurality of public entities,
each server fingerprint comprises encoded information about a corresponding public entity, the encoded information comprising information for identifying the corresponding public entity and information for determining whether to recommend the public entity to a user;

generate, at the client, a user fingerprint based on user information associated with the user, the user fingerprint comprising encoded user information, wherein the user information comprises information representative of the user's interests and wherein the user fingerprint is not transmitted outside the client;
compare, at the client, the user fingerprint with the select server fingerprints to select at least one server fingerprint for recommendation;
generate, at the client, at least one recommendation of a public entity corresponding to the at least one server fingerprint for recommendation;
receive, at the client, a search result based on an information search request made by the user;
modify, at the client, the search result based on the generated recommendation; and
display the modified search result.

14. The system of claim 13, further comprising a data store, wherein the processor is further configured to:
store the select server fingerprints in the data store;
update the user fingerprint based on user feedback;
compare the updated user fingerprint with the stored select server fingerprints to select an updated server fingerprint for recommendation; and
generate an updated recommendation of a public entity corresponding to the updated server fingerprint for recommendation.

15. The system of claim 13, wherein the plurality of public entities comprise at least one of a web site, an article, a blog, and a user on a social networking site.

16. The system of claim 13, wherein the encoded information about the corresponding public entity comprises relevancy values corresponding to a plurality of keywords, each of the relevancy values representing relevancy of the corresponding public entity to each keyword.

17. The system of claim 13, wherein the user information comprises at least one of a search history of the user, web page access history of the user, and web page bookmarks of the user.

18. The system of claim 13, wherein the encoded user information comprises relevancy values corresponding to a plurality of keywords, each of the relevancy values representing relevancy of the user information to each keyword.

19. The system of claim 13, wherein the select server fingerprints are selected based on at least one of popularity of the corresponding public entity, a category of public entities requested by the user, geographic location associated with the user, and language requested by the user.

20. A machine-readable storage medium comprising machine-readable instructions for causing a processor to execute a method for anonymously recommending public entities, the method comprising:
receiving, at a client of a user from a server, a number of select server fingerprints selected from server fingerprints based on predetermined metrics, the server fingerprints corresponding to a plurality of public entities, wherein
the select server fingerprints are received in response to a user action and the predetermined metrics comprise at least one of user-defined criteria communicated to the server from the client and popularity of the plurality of public entities,
each server fingerprint comprises encoded information about a corresponding public entity, the encoded information comprising information for identifying the corresponding public entity and information for determining whether to recommend the public entity to a user;

generating, at the client, a user fingerprint based on user information associated with the user, the user fingerprint comprising encoded user information, wherein the user information comprises information representative of the user's interests and wherein the user fingerprint is not transmitted outside the client;

comparing, at the client, the user fingerprint with the select server fingerprints to select at least one server fingerprint for recommendation;

generating, at the client, at least one recommendation of a public entity corresponding to the at least one server fingerprint for recommendation; and displaying the at least one recommendation.

\* \* \* \* \*